(12) United States Patent
Allen et al.

(10) Patent No.: US 7,146,362 B2
(45) Date of Patent: Dec. 5, 2006

(54) METHOD AND APPARATUS FOR USING FACETED METADATA TO NAVIGATE THROUGH INFORMATION RESOURCES

(75) Inventors: Bradley P. Allen, Manhattan Beach, CA (US); Cormac Tworney, Marina Del Rey, CA (US); John B. Jensen, Hermosa Beach, CA (US)

(73) Assignee: Bpallen Technologies LLC, Los Angeles, CA (US)

( * ) Notice: Subject to any disclaimer, the term of this patent is extended or adjusted under 35 U.S.C. 154(b) by 438 days.

(21) Appl. No.: 10/650,200

(22) Filed: Aug. 26, 2003

(65) Prior Publication Data

US 2004/0044661 A1    Mar. 4, 2004

Related U.S. Application Data

(60) Provisional application No. 60/406,959, filed on Aug. 28, 2002.

(51) Int. Cl.
*G06F 17/30* (2006.01)
(52) U.S. Cl. .................. 707/5; 707/4; 707/10
(58) Field of Classification Search .................. 707/2, 707/3, 4, 5, 8, 10, 100
See application file for complete search history.

(56) References Cited

U.S. PATENT DOCUMENTS

| | | | |
|---|---|---|---|
| 5,047,918 A | 9/1991 | Schwartz et al. ........... 364/200 |
| 5,115,504 A | 5/1992 | Belove et al. .............. 395/600 |
| 5,162,992 A | 11/1992 | Williams .................... 364/419 |
| 5,201,047 A | 4/1993 | Maki et al. ................. 395/600 |
| 5,201,048 A | 4/1993 | Coulter et al. ............. 395/600 |
| 5,204,947 A | 4/1993 | Bernstein et al. ........... 395/157 |
| 5,206,949 A | 4/1993 | Cochran et al. ............ 395/600 |
| 5,276,867 A | 1/1994 | Kenley et al. .............. 395/600 |
| 5,544,360 A | 8/1996 | Lewak et al. ............... 395/600 |
| 6,006,225 A * | 12/1999 | Bowman et al. ............... 707/5 |
| 6,308,168 B1 * | 10/2001 | Dovich et al. ................. 707/1 |
| 6,334,124 B1 * | 12/2001 | Bouchard et al. ............. 707/3 |
| 6,546,388 B1 * | 4/2003 | Edlund et al. ................ 707/5 |
| 6,789,076 B1 * | 9/2004 | Dutta ........................... 707/5 |
| 2001/0039546 A1 * | 11/2001 | Moore et al. ................ 707/10 |
| 2002/0165856 A1 * | 11/2002 | Gilfillan et al. ............... 707/3 |
| 2003/0046282 A1 * | 3/2003 | Carlson et al. ............... 707/6 |

* cited by examiner

*Primary Examiner*—Greta Robinson
(74) *Attorney, Agent, or Firm*—Park, Vaughan & Fleming LLP (57) ABSTRACT

One embodiment of the present invention provides a system that uses faceted metadata to facilitate navigation through information resources. During operation, the system receives a query from a client at a server. The system then performs the query on metadata, wherein the metadata contains facets that describe characteristics of the information resources. While performing the query, the system generates results that identify information resources that satisfy the query. Next, the system constructs a response containing the results, the query, and suggestions on how to refine the query. The system then sends the response to the client, thereby allowing the client to refine the query. In this way, the client and server can work together in a stateless manner to refine the query without having to maintain state information about the query on the server.

43 Claims, 7 Drawing Sheets

FIG. 4 seamark™ Search [All Fields ▼] [    ] [Search] [New Search]
The Enterprise Navigator For Digital Information & Components 1239 Medical Journal Articles subject
  Antibiotics 28
  Asthma 28
  Blood Proteins 27
  Cystic Fibrosis 1017
  Lung 28
  Meconium 31
  Pseudomonas Infections 34
  Pseudomonas aeruginosa 36
  Sputum 27
  Sweat 37
  *811 more* author
  C F Doershuk 18
  H Shwachman 32
  L M Taussig 16
  L W Matthews 17
  N Hoiby 24
  R B Elliott 15
  R C Stern 20
  R E Wood 15
  T F Boat 25
  W J Warwick 15
  *2056 more* publisher
  Acta-Paediatr-Scand 22
  Am-J-Dis-Child 23
  Am-Rev-Respir-Dis 35
  Arch-Dis-Child 52
  Clin-Chim-Acta 33
  J-Pediatr 73
  Lancet 81
  Monogr-Paediatr 34
  Pediatr-Res 80
  Pediatrics 45
  *300 more* subject
  1974 163
  1974-75 1
  1975 189
  1976 229
  1977 199
  1978 199
  1979 259

FIG. 5A seamark™
The Enterprise Navigator for Digital Information & Components

Search [All Fields ▼] [        ] [ Search ] [ New Search ]

28 Medical Journal Articles matching  Sort by title [▽△] medicineNumber [▽△]  1 to 4 of 28 Medical
[X] subject 'Antibiotics'  author [▽△] publisher [▽△] date [▽△]  Journal Articles | Next subject
  Carbenicillin 3
  Cystic Fibrosis 25
  Gentamicins 2
  Lung Diseases 6
  Penicillins 2
  Pseudomonas Infections 9
  Pseudomonas aeruginosa 5
  Respiratory Tract Infections 5
  Sputum 2
  Tobramycin 10
  *24 more* author
  B Friis 3
  B I Bogart 2
  D Roser 2
  H C Neu 2
  H Knothe 2
  J A Raeburn 2
  J R Govan 2
  R Wonne 2
  S W Bender 2
  W Ristow 2
  *55 more* publisher
  Am-J-Clin-Nutr 1
  Antimicrob-Agents-Chemother 1
  Int-J-Pediatr-Otorhinolaryngol 1
  J-Antimicrob-Chemother 4
  J-Infect-Dis 3
  Med-J-Aust 1
  Monogr-Paediatr 2
  Pediatr-Res 2
  Pediatrics 1
  Scand-J-Infect-Dis 2
  *10 more* date
  1974 4
  1975 2
  1976 8
  1977 1
  1978 5
  1979 8

A comparative study of ticarcillin plus tobramycin versus carbenicillin plus gentamicin for the treatment of serious infections due to gram-negative bacilli.
*medlineNumber*: 78184587
*subject*: Pseudomonas Infections, Antibiotics [X], Gentamicins, Carbenicillin, Tobramycin, Penicillins, Ticarcillin, Gram-Negative Aerobic Bacteria
*source*: Am-J-Med. 1978 Jun. 64(6). P 961-6.
*author*: M F Parry, H C Neu
*publisher*: Am-J-Med
*date*: 1978

Antibiotic management of cystic fibrosis.
*medlineNumber*: 76259939
*subject*: Cystic Fibrosis, Respiratory Tract Infections, Antibiotics[X]
*source*: J-Antimicrob-Chemother. 1976 Jun. 2(2). P 107-9.
*author*: J A Raeburn
*publisher*: J-Antimicrob-Chemother
*date*: 1976

Antibiotic therapy and cystic fibrosis: increased resistance of mucoid Pseudomonas aeruginosa to carbenicillin.
*medlineNumber*: 76259953
*subject*: Cystic Fibrosis, Pseudomonas aeruginosa, Antibiotics [X], Carbenicillin
*source*: J-Antimicrob-Chemother. 1976 Jun. 2(2). P 215-7.
*author*: J R Govan
*publisher*: J-Antimicrob-Chemother
*date*: 1976

Antimicrobial susceptibilities of rough, smooth, and mucoid colony types of Pseudomonas isolated from cystic fibrosis patients.
*medlineNumber*: 79230232
*subject*: Cystic Fibrosis, Antibiotics[X], Pseudomonas
*source*: Antimicrob-Agents-Chemother. 1979 Mar. 15(3). P 494-6.
*author*: Moore J Blessing, B A Maybury, S A deWit, N J Lewiston, A S Yeager
*publisher*: Antimicrob-Agents-Chemother
*date*: 1979

FIG. 5B seamark™
The Enterprise Navigator for Digital Information & Components

Search [All Fields ▼] [        ] [Search] [New Search]

3 Medical Journal Articles matching
☒ subject 'Antibiotics'
☒ publisher 'J-Infect-Dis'

Sort by title [▽▲] medicineNumber [▽▲]
author [▽▲] publisher [▽▲] date [▽▲]

1 to 3 of 3 Medical Journal Articles subject
Lung Diseases 1
Penicillins 1
Sputum 1
Ticarcillin 1 author
D N Crozier 1
E J Hanson 1
H C Neu 1
J A Raeburn 1
M F Parry 1
S R Khan 1
W M McCrae 1

Tobramycin and ticarcillin therapy for exacerbations of pulmonary disease in patients with cystic fibrosis.
*medlineNumber*: 77007745
*subject*: Cystic Fibrosis, Pseudomonas Infections, Lung Diseases, Antibiotics ☒, Tobramycin, Penicillins, Ticarcillin
*source*: J-Infect-Dis. 1976 Aug. 134 Suppl. P S194-7.
*author*: M F Parry, H C Neu
*publisher*: J-Infect-Dis ☒
*date*: 1976

Tobramycin in treatment of infections due to Pseudomonas aeruginosa in patients with cystic fibrosis.
*medlineNumber*: 77007743
*subject*: Cystic Fibrosis, Pseudomonas Infections, Antibiotics ☒, Tobramycin
*source*: J-Infect-Dis. 1976 Aug. 134 Suppl. P S187-90.
*author*: D N Crozier, S R Khan
*publisher*: J-Infect-Dis ☒
*date*: 1976

Tobramycin therapy of infections due to Pseudomonas aeruginosa in patients with cystic fibrosis: effect of dosage and concentration of antibiotic in sputum.
*medlineNumber*: 77007744
*subject*: Cystic Fibrosis, Pseudomonas Infections, Sputum, Antibiotics ☒, Tobramycin
*source*: J-Infect-Dis. 1976 Aug. 134 Suppl. P S191-3.
*author*: W M McCrae, J A Raeburn, E J Hanson
*publisher*: J-Infect-Dis ☒
*date*: 1976

METHOD AND APPARATUS FOR USING FACETED METADATA TO NAVIGATE THROUGH INFORMATION RESOURCES

RELATED APPLICATION

This application hereby incorporates by reference and claims priority under 35 U.S.C. §119 to U.S. Provisional Patent Application No. 60/406,959, filed on Aug. 28, 2002, entitled "Teapot Server," by inventor Bradley P. Allen.

BACKGROUND

1. Field of the Invention

The present invention relates to systems for searching through collections of information resources. More specifically, the present invention relates to a method and an apparatus for using faceted metadata to facilitate navigation through information resources.

2. Related Art

Traditional free-text searching or keyword indexing is a simple and inexpensive search solution used by many web sites. Unfortunately, text searching requires users to guess at keywords. Typical users under-specify their searches and are disappointed in the results. To improve the precision of the search, the user's only option is to guess again with a new combination of keywords. However, text search engines give the user little or no guidance on how to improve the search results.

When text search isn't sufficient, many web designers fall back on hierarchical navigation. This can be seen in department-store e-commerce web sites. In such systems, the searcher must navigate through a pre-defined hierarchy, making a series of one-from-many selections before reaching a list of products that might or might not be appropriate.

Although hierarchical navigation works well for simple domains and for well-informed searchers, it acts as a barrier when the desired product doesn't fit the hierarchy, or the searcher does not share the web designer's view of classification. As soon as a searcher confronts a one-from-many choice he doesn't know how to make, the search fails. Often the searcher hits a dead end and is forced to backtrack with no guarantee that the desired object can be found at all.

The Resource Description Framework (RDF) has been developed to describe characteristics of web pages and other resources. RDF can improve web searching by making metadata about web resources explicit. This allows systems use of metadata to perform search queries for the associated web resources.

Existing approaches to expressing RDF queries are generally based on either the syntax and semantics of SQL, or of logic programming environments like Prolog. These existing approaches typically present results in a format, such as RDF, that is usable by machines, but is not easily decipherable by humans. Moreover, these existing approaches do not have built-in support for query reformulation and refinement during a search session, and they do not gracefully handle large result sets.

Hence, what is needed is a method and an apparatus for performing web site searching without the above-described problems.

SUMMARY

One embodiment of the present invention provides a system that uses faceted metadata to facilitate navigation through information resources. During operation, the system receives a query from a client at a server. The system then performs the query on metadata, wherein the metadata contains facets that describe characteristics of the information resources. While performing the query, the system generates results that identify information resources that satisfy the query. Next, the system constructs a response containing the results, the query, and suggestions on how to refine the query. The system then sends the response to the client, thereby allowing the client to refine the query. In this way, the client and server can work together in a stateless manner to refine the query without having to maintain state information about the query on the server.

In a variation on this embodiment, the suggestions on how to refine the query include suggested values for facets of the metadata. These suggested values can include frequently occurring values for facets of the metadata.

In a variation on this embodiment, the suggestions can include instructions on how to display the suggestions to a user.

In a variation on this embodiment, upon receiving the response from the server at the client, the system displays the results and the suggestions on how to refine the query to a user associated with the client. Upon subsequently, receiving a command from the user to modify the query, the system modifies the query in accordance with the command to generate a new query, and then sends the new query from the client to the server.

In a variation on this embodiment, modifying the query in accordance with the command can involve: using one of the suggestions to define a new query term; defining a new query term that is not associated with one of the suggestions (such as a new text search query term); and removing a query term from the query.

In a variation on this embodiment, displaying the results and the suggestions further involves displaying a representation of the state of the query to the user.

In a variation on this embodiment, the query contains a specification of facets to be used in organizing the results, and conditions that results must satisfy.

In a variation on this embodiment, the system automatically creates an initial query by: scanning through facets of the metadata; generating suggestions for facets that have commonly occurring values; and allowing a user to select one or more of the suggestions to create the initial query.

In a variation on this embodiment, the suggestions on how to refine the query can additionally specify frequencies for commonly occurring values of facets in the metadata.

In a variation on this embodiment, prior to receiving the query, the system initializes a database containing the metadata by: receiving the metadata in Resource Description Framework (RDF) format; and storing the metadata in the database.

In a variation on this embodiment, the query and the response are encoded in extensible Markup Language (XML) documents that are transferred between the client and the server.

In a variation on this embodiment, the format of the query and the response are specified by a query language that facilitates navigation using faceted metadata.

BRIEF DESCRIPTION OF THE FIGURES

FIG. 5B presents another page for the exemplary system in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
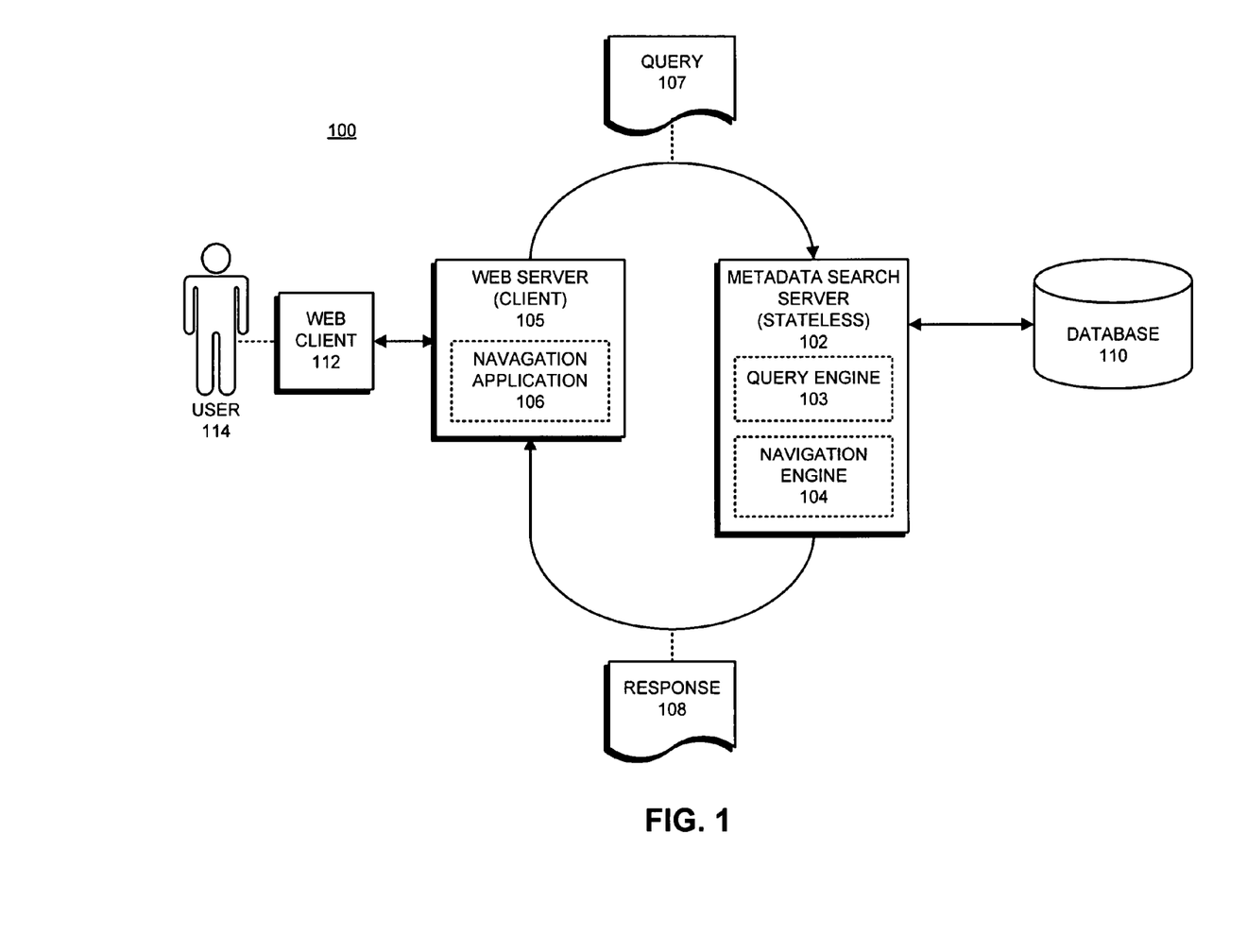
FIG. 1 illustrates a computer system in accordance with an embodiment of the present invention.

FIG. 1 illustrates a computer system 100 in accordance with an embodiment of the present invention. Computer system 100 includes a metadata search server 102, a web server 105 and a web client 112. These entities are coupled together by a network (not shown), which can generally include any type of wire or wireless communication channel capable of coupling together computing nodes. This includes, but is not limited to, a local area network, a wide area network, or a combination of networks. In one embodiment of the present invention, the network includes the Internet.

Web client 112 can generally include any node on the network including computational capability and including a mechanism for making service requests across the network. In FIG. 1, web client 112 is associated with a user 114, who runs applications on web client 112.

Web server 105 can generally include any computational node including a mechanism for servicing requests from a client for computational and/or data storage resources. Web server 105 generally services requests from web client 112. Note that web server 105 is itself a client of metadata search server 102. More specifically, a navigation application 106 on web server 105 interacts with metadata search server 102.

Metadata search server 102 uses faceted metadata to facilitate navigation through information resources in accordance with an embodiment of the present invention. More specifically, metadata search server 102 performs searches and related navigational operations involving data stored within database 110. To this end, metadata search server 102 includes a query engine 103 that makes queries on metadata contained within database 110, and a navigation engine 104 facilitates navigational operations involving the metadata.

During operation, web server 105 submits a query document 107 to metadata search server 102. In response to query document 107, metadata search server 102 returns a response document 108. Response document 108 contains enough information to allow web server 105 to refine the query without having to maintain state information about the query on metadata search server 102. These query-processing operations are described in more detail below with reference to FIGS. 2–5.

System Initialization

Figure 2:
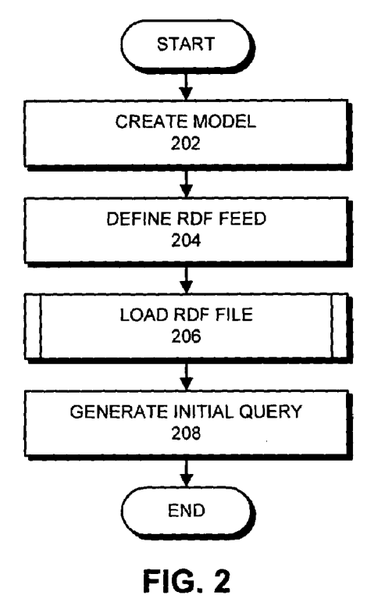
FIG. 2 presents a flow chart illustrating initialization operations in accordance with an embodiment of the present invention.

FIG. 2 presents a flow chart illustrating initialization operations in accordance with an embodiment of the present invention. The system starts by initially creating an empty "model" for storing metadata (step 202). Next, the system loads metadata into the model, for example from an RDF file. In one embodiment of the presenting invention, this involves defining an RDF feed and its properties (step 204), and then using the feed to load an RDF file into the model (step 206).

Figure 3:
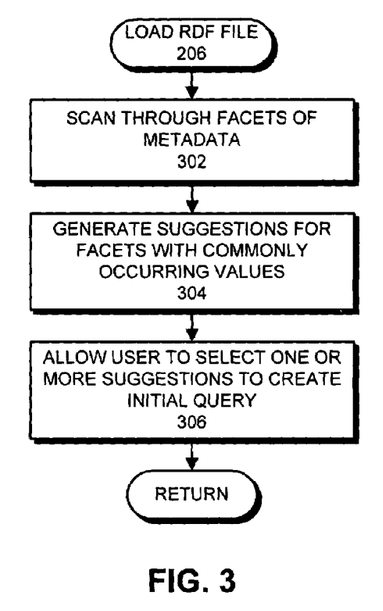
FIG. 3 presents a flow chart illustrating the process of creating an initial query in accordance with an embodiment of the present invention.

Next, the system can generate an initial query (step 208). Referring to FIG. 3, generating an initial query can involve scanning through facets of the metadata (step 302), and then generating suggestions for facets with commonly occurring values (step 304). The system can then allow the user to select one or more suggestions or perform other modifications on the query to create an initial query (step 306).

Query Processing

Figure 4:
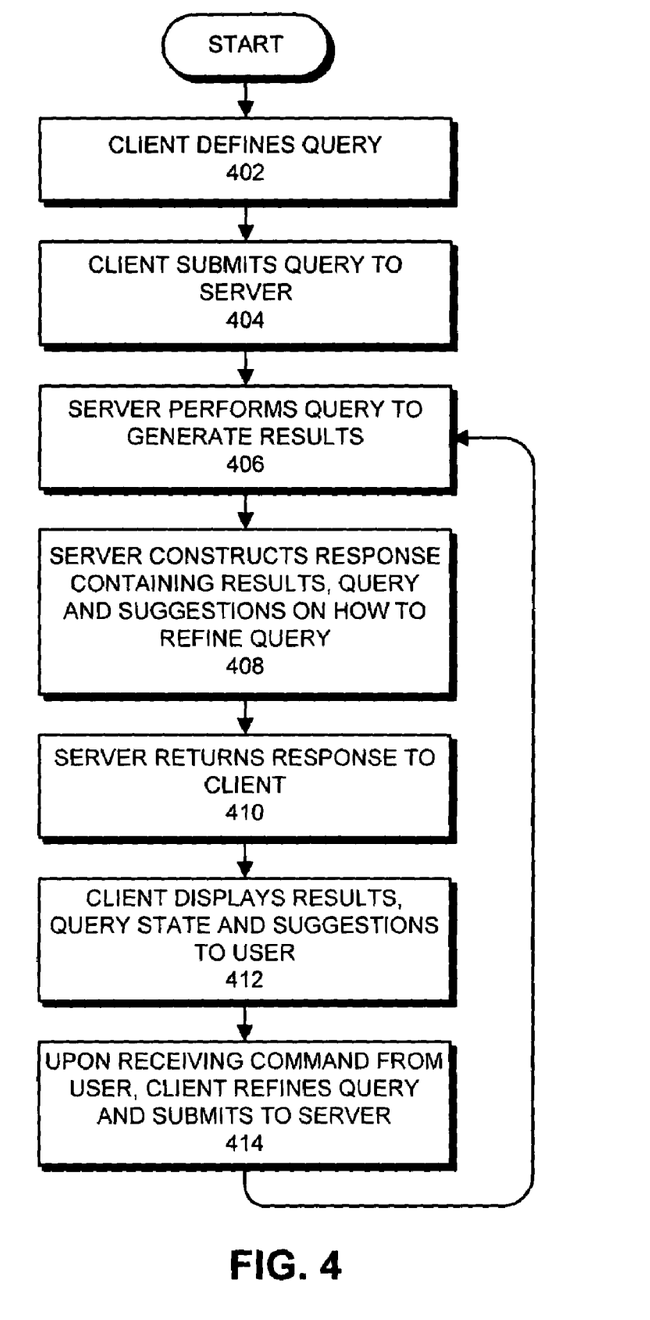
FIG. 4 presents a flow chart illustrating how a query is processed in accordance with an embodiment of the present invention.

FIG. 4 presents a flow chart illustrating how a query is processed in accordance with an embodiment of the present invention. First, the system defines a query (step 402). In doing so, the system can automatically create an initial query as outlined above, or alternatively, the user can explicitly create a query. The client then submits the query to the server (step 404).

Note that a query can include simple query terms that specify conditions such as "attribute=value", wherein the attribute is an attribute of the resource (also referred to as a facet) and the value is a value for the attribute. Additionally, the "=" relation can be replaced with other relations, such as, "<", ">", "≦" or "contains". For example, the simple query term "attribute contains string" can be used to perform a text search for the string within the attribute. These simple query terms can additionally be compounded using operators, such as, NOT, OR, and AND. (Note that the AND operator is typically implicit.)

The query can also suggest particular facets to be used in organizing the results, and can also include instructions on how to display the particular facets.

Next, the server performs the query to generate a set of results that satisfy the query conditions (step 406). The server then constructs a response containing the results, the query and suggestions on how to refine the query (step 408). For example, the suggestions can include frequently occurring values (or other interesting values) for facets of the metadata. As mentioned above, the suggestions can also include suggestions on how to display the suggestions to a user. At this point, the server can forget state information relating to the query, which means that the server will be "stateless" when it receives the next query.

The server then returns the response to the client (step 410). The client then displays the query result, the query state and the suggestions to the user (step 412). The user can then perform a number of actions to refine the query. For example, the user can select one of the suggestions, can define a new query term, can define a new text search term, or can remove a term from the query. These user actions generate one or more commands.

Upon receiving these commands from the user, the client refines the query and submits it to the server (step 414). The system then returns to step 406 to process the new query. This process can be repeated as long as the user wants to continue refining the query.

In a variation on this embodiment, the format of the query and the response are specified in an XML-based query language that facilitates navigation using faceted metadata.

EXAMPLE

Figure 5A:
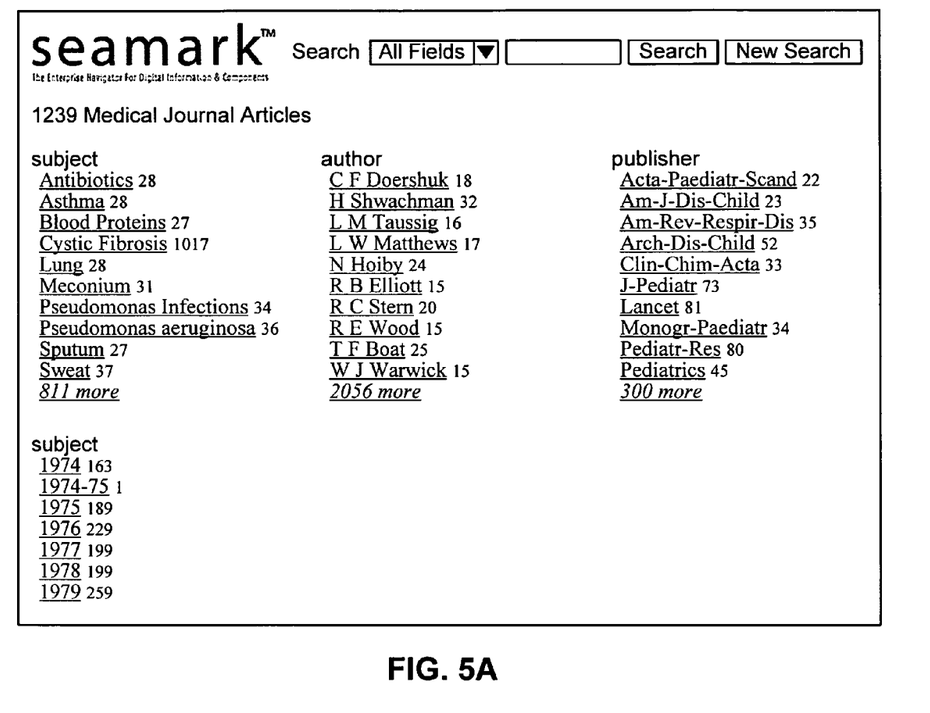
FIG. 5A presents a page for an exemplary system in accordance with an embodiment of the present invention.

FIG. 5A presents an initial page of an exemplary search in accordance with an embodiment of the present invention. This initial page indexes 1239 articles from medical journal articles. This page allows the user to perform a number of actions. By entering a text string into the field in the upper-right portion of the screen, a user can perform a keyword search, as many web sites do.

Alternatively, the user can select values for facets that describe properties, such as "subject", "author", "publisher", and "date". Selecting a value narrows the search. For example, selecting the subject "Antibiotics" narrows the collection down to 28 matching articles as is illustrated in FIG. 5B. Note that metadata (and possible other information) associated with the matching articles appears on the right-hand side of FIG. 5B.

Further refinement suggestions appear on the left-hand side of FIG. 5B. In additional to facilitating navigation, these refinement suggestions provide useful information on the frequency of suggestions. For example, from FIG. 5B we can see that 25 of the 28 articles containing the subject "Antibiotics" also contain the subject "Cystic Fibrosis".

The query state appears on the top of the left-hand side of FIG. 5B. In this example, the query state indicates that the query has the condition "subject 'Antibiotics'".

The user can further refine this query, for example, by selecting the publisher "J-Infect-Dis" which is an abbreviation for the "Journal of Infectious Diseases". This narrows the collection down to 3 articles as is illustrated in FIG. 5C.

Figure 5C:
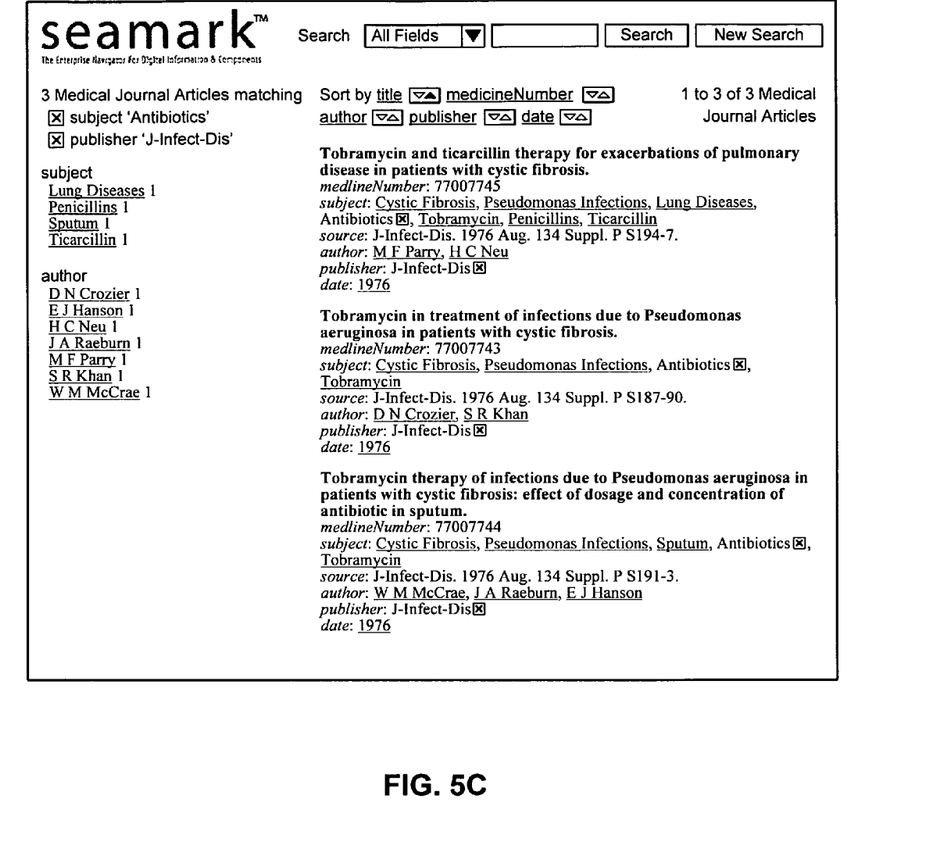
FIG. 5C presents yet another page for the exemplary system in accordance with an embodiment of the present invention.
Figure 5D:
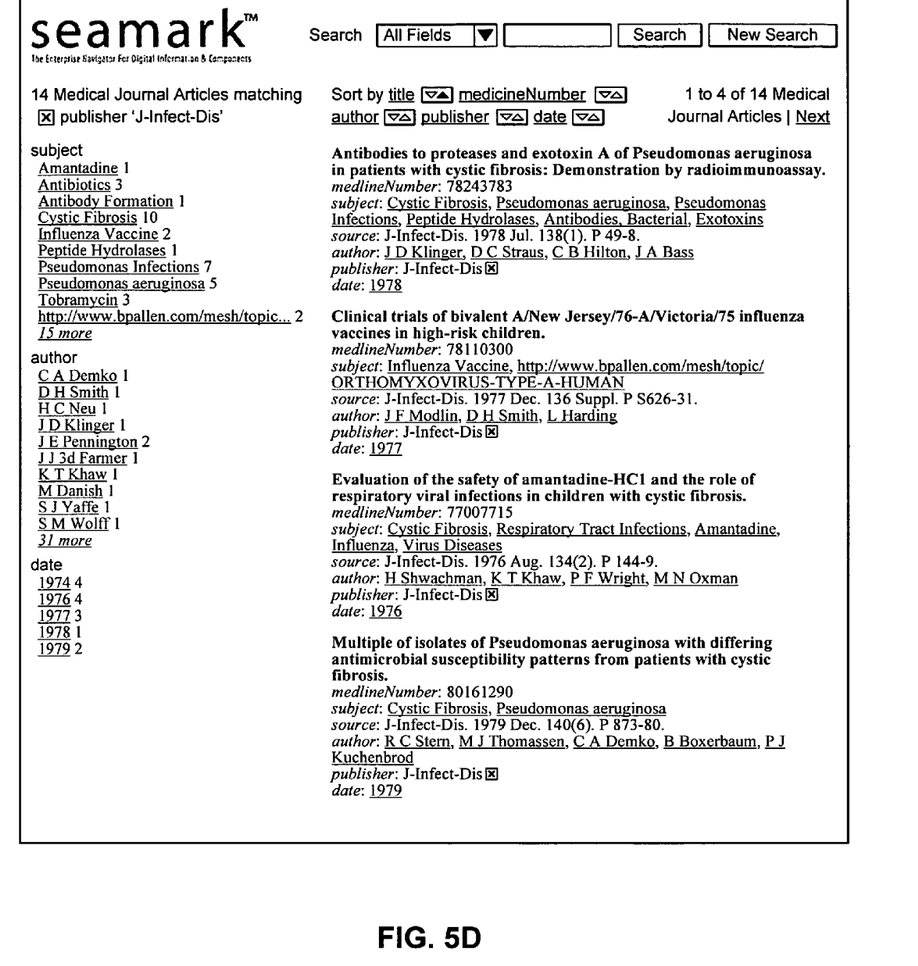
FIG. 5D presents another page for the exemplary system in accordance with an embodiment of the present invention.

Note that the selected criteria can be removed by deselecting the checkboxes next to the conditions in the query state (which appears in the upper left-hand side of FIG. 5C). For example, deselecting the "subject 'Antibiotics'" checkbox broadens the collection to 14 articles as is illustrated in FIG. 5D.

As can be seen from the example above, the present invention helps the user to quickly navigate to the right answer. The user does not have to guess at keywords because the system provides the available keywords. Moreover, the user is not locked into a rigid hierarchy because the user can partition the collection in any way the user wants to. During a search, the user can always see a few results that provide an intuitive guide to the success of the search. If the user hits a dead end, the user is able to back out by relaxing previous selections.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using faceted metadata to facilitate navigation through information resources, comprising:
   receiving a query from a client at a server;
   performing the query on the faceted metadata, wherein the faceted metadata contains facets that describe characteristics of the information resources, and wherein performing the query generates results that identify information resources that satisfy the query;
   navigating to an information resource;
   constructing a response containing the results from the information resource, the query, and suggestions on how to refine the query; and
   sending the response to the client, thereby allowing the client to refine the query;
   whereby the client and server can work together in a stateless manner to refine the query and navigate through information resources without having to maintain state information about the query on the server.

2. The method of claim 1, wherein the suggestions on how to refine the query include suggested values for facets of the faceted metadata.

3. The method for claim 2, wherein the suggested values can include frequently occurring values for facets of the faceted metadata.

4. The method of claim 1, wherein the suggestions can include instructions on how to display the suggestions to a user.

5. The method of claim 1, further comprising:
   receiving the response from the server at the client;
   displaying the results and the suggestions on how to refine the query to a user associated with the client;
   upon receiving a command from the user to modify the query,
      modifying the query in accordance with the command to generate a new query, and
      sending the new query from the client to the server.

6. The method of claim 5, wherein modifying the query in accordance with the command can involve:
   using one of the suggestions to define a new query term;
   defining a new query term that is not associated with one of the suggestions; and
   removing a query term from the query.

7. The method of claim 6, wherein defining a new query term that is not associated with one of the suggestions can involve defining a new text search query term.

8. The method of claim 5, wherein displaying the results and the suggestions further involves displaying a representation of the state of the query to the user.

9. The method of claim 1, wherein the query can contain: a specification of facets to be used in organizing the results; and conditions that results must satisfy.

10. The method of claim 1, further comprising automatically creating the query by:
   scanning through facets of the faceted metadata;
   generating suggestions for facets that have commonly occurring values; and
   allowing a user to select one or more of the suggestions to create the query.

11. The method of claim 1, wherein the suggestions on how to refine the query can additionally specify frequencies for commonly occurring values of facets in the faceted metadata.

12. The method of claim 1, wherein prior to receiving the query, the method further comprises initializing a database containing the faceted metadata by:
receiving the faceted metadata in Resource Description Framework (RDF) format; and
storing the faceted metadata in the database.

13. The method of claim 1, wherein the query and the response are encoded in eXtensible Markup Language (XML) documents that are transferred between the client and the server.

14. The method of claim 1, wherein the format of the query and the response are specified by a query language that facilitates navigation using the faceted metadata.

15. A computer-readable storage medium storing instructions that when executed by a computer cause the computer to perform a method for using faceted metadata to facilitate navigation through information resources, the method comprising:
receiving a query from a client at a server;
performing the query on the faceted metadata, wherein the faceted metadata contains facets that describe characteristics of the information resources, and wherein performing the query generates results that identify information resources that satisfy the query;
navigating to an information resource;
constructing a response containing the results from the information resource, the query, and suggestions on how to refine the query; and
sending the response to the client, thereby allowing the client to refine the query;
whereby the client and server can work together in a stateless manner to refine the query and navigate through information resources without having to maintain state information about the query on the server.

16. The computer-readable storage medium of claim 15, wherein the suggestions on how to refine the query include suggested values for facets of the faceted metadata.

17. The computer-readable storage medium for claim 16, wherein the suggested values can include frequently occurring values for facets of the faceted metadata.

18. The computer-readable storage medium of claim 15, wherein the suggestions can include instructions on how to display the suggestions to a user.

19. The computer-readable storage medium of claim 15, wherein the method further comprises:
receiving the response from the server at the client;
displaying the results and the suggestions on how to refine the query to a user associated with the client;
upon receiving a command from the user to modify the query,
modifying the query in accordance with the command to generate a new query, and
sending the new query from the client to the server.

20. The computer-readable storage medium of claim 19, wherein modifying the query in accordance with the command can involve:
using one of the suggestions to define a new query term;
defining a new query term that is not associated with one of the suggestions; and
removing a query term from the query.

21. The computer-readable storage medium of claim 20, wherein defining a new query term that is not associated with one of the suggestions can involve defining a new text search query term.

22. The computer-readable storage medium of claim 19, wherein displaying the results and the suggestions further involves displaying a representation of the state of the query to the user.

23. The computer-readable storage medium of claim 15, wherein the query can contain:
a specification of facets to be used in organizing the results; and
conditions that results must satisfy.

24. The computer-readable storage medium of claim 15, wherein the method further comprises automatically creating the query by:
scanning through facets of the faceted metadata;
generating suggestions for facets that have commonly occurring values; and
allowing a user to select one or more of the suggestions to create the query.

25. The computer-readable storage medium of claim 15, wherein the suggestions on how to refine the query can additionally specify frequencies for commonly occurring values of facets in the faceted metadata.

26. The computer-readable storage medium of claim 15, wherein prior to receiving the query, the method further comprises initializing a database containing the faceted metadata by:
receiving the faceted metadata in Resource Description Framework (RDF) format; and
storing the faceted metadata in the database.

27. The computer-readable storage medium of claim 15, wherein the query and the response are encoded in eXtensible Markup Language (XML) documents that are transferred between the client and the server.

28. The computer-readable storage medium of claim 15, wherein the format of the query and the response are specified by a query language that facilitates navigation using the faceted metadata.

29. An apparatus for using faceted metadata to facilitate navigation through information resources, comprising:
a receiving mechanism configured to receive a query from a client at a server;
a database configured to perform the query on the faceted metadata, wherein the faceted metadata contains facets that describe characteristics of the information resources, and wherein performing the query generates results that identify information resources that satisfy the query;
a navigation mechanism configured to navigate to an information resource; and
a response generation mechanism configured to,
construct a response containing the results from the information resource, the query, and suggestions on how to refine the query, and to
send the response to the client, thereby allowing the client to refine the query;
whereby the client and server can work together in a stateless manner to refine the query and navigate through information resources without having to maintain state information about the query on the server.

30. The apparatus of claim 29, wherein the suggestions on how to refine the query include suggested values for facets of the faceted metadata.

31. The apparatus for claim 30, wherein the suggested values can include frequently occurring values for facets of the faceted metadata.

32. The apparatus of claim 29, wherein the suggestions can include instructions on how to display the suggestions to a user.

33. The apparatus of claim 29, further comprising a query generation mechanism on the client configured to:
receive the response from the server;
display the results and the suggestions on how to refine the query to a user; and
upon receiving a command from the user to modify the query, to
modify the query in accordance with the command to generate a new query, and to
send the new query from the client to the server.

34. The apparatus of claim 33, wherein while modifying the query in accordance with the command the query generation mechanism can:
use one of the suggestions to define a new query term;
define a new query term that is not associated with one of the suggestions; and
remove a query term from the query.

35. The apparatus of claim 34, wherein while defining a new query term that is not associated with one of the suggestions, the query generation mechanism can define a new text search query term.

36. The apparatus of claim 33, wherein while displaying the results and the suggestions, the query generation mechanism is additionally configured to displaying a representation of the state of the query to the user.

37. The apparatus of claim 29, wherein the query can contain: a specification of facets to be used in organizing the results; and conditions that results must satisfy.

38. The apparatus of claim 29, further comprising a query generation mechanism that is configured to:
scan through facets of the faceted metadata;
generate suggestions for facets that have commonly occurring values; and to
allow a user to select one or more of the suggestions to create the query.

39. The apparatus of claim 29, wherein the suggestions on how to refine the query can additionally specify frequencies for commonly occurring values of facets in the faceted metadata.

40. The apparatus of claim 29, further comprising a database initialization mechanism that is configured to:
receive the faceted metadata in Resource Description Framework (RDF) format; and to
store the faceted metadata in a database.

41. The apparatus of claim 29, wherein the query and the response are encoded in eXtensible Markup Language (XML) documents that are transferred between the client and the server.

42. The apparatus of claim 29, wherein the format of the query and the response are specified by a query language that facilitates navigation using the faceted metadata.

43. A means for using faceted metadata to facilitate navigation through information resources, comprising:
a receiving means for receiving a query from a client at a server;
a database means for performing the query on the faceted metadata, wherein the faceted metadata contains facets that describe characteristics of the information resources, and wherein performing the query generates results that identify information resources that satisfy the query;
a navigation means for navigating to an information resource;
a response generation means for generating a response containing the results from the information resource, the query, and suggestions on how to refine the query; and
a sending means for sending the response to the client, thereby allowing the client to refine the query;
whereby the client and server can work together in a stateless manner to refine the query and navigate through information resources without having to maintain state information about the query on the server.

* * * * *

UNITED STATES PATENT AND TRADEMARK OFFICE
CERTIFICATE OF CORRECTION

| | | |
|---|---|---|
| PATENT NO. | : 7,146,362 B2 | Page 1 of 1 |
| APPLICATION NO. | : 10/650200 | |
| DATED | : December 5, 2006 | |
| INVENTOR(S) | : Bradley P. Allen et al. | |

It is certified that error appears in the above-identified patent and that said Letters Patent is hereby corrected as shown below:

Title Page #75
   In Inventors section, please delete the second inventors last name, "Tworney" and replace with the last name --Twomey--.

Signed and Sealed this

Twentieth Day of February, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,146,362 B2 | |
| APPLICATION NO. | : 10/650200 | |
| DATED | : December 5, 2006 | |
| INVENTOR(S) | : Bradley P. Allen et al. | |

It is certified that error appears in the above-identified patent and that said Letters Patent is hereby corrected as shown below:

Title Page
In Inventors section, please delete the second inventors last name, "Tworney" and replace with the last name --Twomey--.

73
The Assignee should read --Siderean Software, Inc., Manhattan Beach, CA(US)--

Signed and Sealed this

Second Day of October, 2007

JON W. DUDAS
*Director of the United States Patent and Trademark Office*